United States Patent
Kwon et al.

(10) Patent No.: US 8,554,225 B2
(45) Date of Patent: Oct. 8, 2013

(54) METHOD FOR SWITCHING OPERATING CARRIER AT A USER EQUIPMENT IN WIRELESS COMMUNICATION SYSTEM

(75) Inventors: Yeong Hyeon Kwon, Gyeonggi-do (KR); Jae Hoon Chung, Gyeonggi-do (KR); Seung Hee Han, Gyeonggi-do (KR); So Yeon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 13/124,117

(22) PCT Filed: Mar. 12, 2010

(86) PCT No.: PCT/KR2010/001576
§ 371 (c)(1),
(2), (4) Date: Apr. 13, 2011

(87) PCT Pub. No.: WO2010/104361
PCT Pub. Date: Sep. 16, 2010

(65) Prior Publication Data
US 2011/0312326 A1 Dec. 22, 2011

Related U.S. Application Data

(60) Provisional application No. 61/159,447, filed on Mar. 12, 2009.

(51) Int. Cl.
*H04W 36/00* (2009.01)
*H04B 7/00* (2006.01)
*H04W 36/30* (2009.01)
*H04W 36/08* (2009.01)

(52) U.S. Cl.
CPC .............. *H04W 36/30* (2013.01); *H04W 36/08* (2013.01)

USPC ........ 455/436; 455/456.1; 455/502; 455/509; 455/515; 370/329; 370/335

(58) Field of Classification Search
USPC ...................... 455/436, 509, 515, 456.1, 502; 370/329, 335
See application file for complete search history.

(56) References Cited

U.S. PATENT DOCUMENTS

| | | | |
|---|---|---|---|
| 7,593,738 B2 * | 9/2009 | Anderson | .................. 455/456.1 |
| 2005/0197131 A1 | 9/2005 | Ikegami | |
| 2007/0161385 A1 * | 7/2007 | Anderson | ...................... 455/502 |
| 2011/0026475 A1 * | 2/2011 | Lee et al. | ........................ 370/329 |
| 2011/0026495 A1 * | 2/2011 | Lee et al. | ...................... 370/335 |

(Continued)

FOREIGN PATENT DOCUMENTS

| | | |
|---|---|---|
| CN | 1832621 | 9/2006 |
| CN | 101371475 | 2/2009 |

(Continued)

*Primary Examiner* — William D Cumming
(74) *Attorney, Agent, or Firm* — Lee, Hong, Degerman, Kang & Waimey

(57) ABSTRACT

According to one embodiment, a method for switching operating carrier at a user equipment (UE) includes receiving a message including a carrier index of a target carrier for a current primary carrier change from a base station. The message further includes action time information indicating a start time in which the mobile station switches from the current primary carrier to the target carrier. The UE may switch from a current operating carrier to the indicated target carrier based on the received action time information and the carrier index of the target carrier.

11 Claims, 3 Drawing Sheets

(56) References Cited

U.S. PATENT DOCUMENTS

2011/0039593 A1* 2/2011 Lee et al. .................... 455/515
2011/0312326 A1* 12/2011 Kwon et al. ................ 455/436
2012/0231828 A1* 9/2012 Wang et al. ................. 455/509

FOREIGN PATENT DOCUMENTS

| | | |
|---|---|---|
| KR | 1020040079658 | 9/2004 |
| KR | 1020050089685 | 9/2005 |
| KR | 1020050089694 | 9/2005 |

\* cited by examiner

METHOD FOR SWITCHING OPERATING CARRIER AT A USER EQUIPMENT IN WIRELESS COMMUNICATION SYSTEM

REFERENCE TO RELATED APPLICATIONS

This application is the National Stage filing under 35 U.S.C. 371 of International Application No. PCT/KR2010/001576, filed on Mar. 12, 2010, which claims the benefit of U.S. Provisional Application Ser. No. 61/159,447, filed on Mar. 12, 2009, the contents of which are incorporated by reference herein in their entirety.

TECHNICAL FIELD

The present invention relates to wireless communication, more specially, the present invention relates to a method for switching operating carrier at a user equipment (UE).

BACKGROUND ART

In a system where multiple carriers may be used for UE operations simultaneously, the carrier assignment to each UE is important issue since the way to manage system carriers should be optimized to achieve maximal system performance and throughput. The situation may happen at the time of UE initial access to system, UE handover, carrier load balancing, multi-cell operation on specific carrier(s), per-UE traffic variation, and so on. During these cases, an eNB may need to reorganize the carrier utilization scheme of each UE so that specific carrier may be empty or managed to the target status, while UE have to retain the sustained service provision from the corresponding eNB(s). Multiple eNBs or cells may be responsible to this change (e.g., situation of CoMP operation).

However, in a system where multiple carriers may be used for UE operations simultaneously, a method of managing the carrier assignment has not studied yet.

DISCLOSURE OF INVENTION

Technical Problem

Accordingly, the present invention is directed to a method for switching operating carrier in a wireless communication system that substantially obviates one or more problems due to limitations and disadvantages of the related art.

Solution to Problem

To achieve these objects and other advantages and in accordance with the purpose of the invention, as embodied and broadly described herein. A method for switching operating carrier at a user equipment (UE) in wireless communication system includes receiving target carrier information indicating a target carrier of the UE and target carrier transition time information indicating a time difference between receiving timing of transition indication and transition completion timing from an base station (BS); and switching a current operating carrier to the indicated target carrier based on the received the target carrier transition time information and the target carrier information.

Preferably, the method further include transmitting a ACK/NACK confirm signal indicating whether the target carrier transition time information and the target carrier information is received without error via on the target carrier to the base station.

Alternatively, the method further include transmitting a ACK/NACK confirm signal indicating whether the target carrier transition time information and the target carrier information is received without error via on the target carrier and the current operating carrier to the base station.

In another aspect of the present invention, a user equipment (UE) for switching operating carrier in wireless communication system includes a receiving module for receiving target carrier information indicating a target carrier of the UE and target carrier transition time information indicating a time difference between receiving timing of transition indication and transition completion timing from an base station (BS); and a switching module for switching from a current operating carrier to the indicated target carrier based on the received the target carrier transition time information and the target carrier information.

Preferably, the UE further include a transmitting module for transmitting a ACK/NACK confirm signal indicating whether the target carrier transition time information and the target carrier information is received without error via on the target carrier to the base station.

Alternatively, the UE further include a transmitting module for transmitting a ACK/NACK confirm signal indicating whether the target carrier transition time information and the target carrier information is received without error via on the target carrier and the current operating carrier to the base station.

Advantageous Effects of Invention

According to a method for switching operating carrier at a user equipment of the present invention, one or more component carriers may be assigned to a UE as special carriers. This management procedures related with the special carriers may be utilized as load balancing or other system management or system-wise/cell-group wise coordination purposes.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
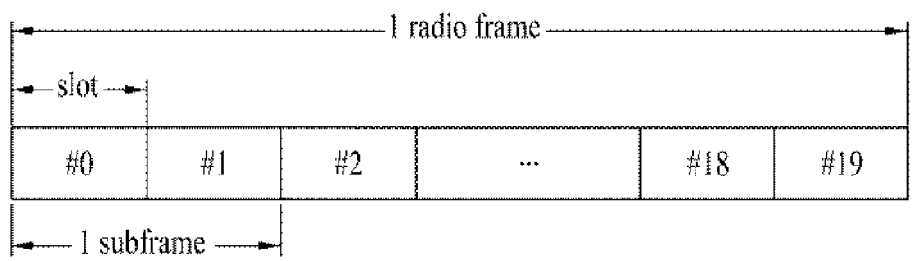
FIG. 1 illustrates a radio frame structure of 3GPP LTE.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. For example, the following detailed description is given under the assumption that a mobile communication system is a 3GPP LTE system. However, the description is applicable to any other mobile communication systems except for specific features of the 3GPP LTE system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, 'mobile station (MS)' is assumed to refer to a mobile or fixed user end device such as a user equipment (UE), and 'base station (BS)' is assumed to refer to any node of a network end, such as a node B and an eNode B, communicating with the MS. Also, femtocell BS may be referred to femtocell access point (FAP).

In a mobile communication system, an MS may receive information from a BS through a downlink and the MS may transmit information to the BS through an uplink. Information transmitted or received by the MS includes data and control information. There are various physical channels according to types and purposes of information transmitted or received by the MS.

Techniques, apparatus and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features of the present invention are not limited thereto.

FIG. 1 illustrates a radio frame structure of 3GPP LTE.

Referring to FIG. 1, a radio frame may include 10 subframes. A subframe may include two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. One slot may include 7 symbols. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Carrier assignment may be categorized into several aspects as follows.

1) Single carrier may be allocated to a user equipment (UE) as anchor carrier. 2) Multiple carriers may be allocated a UE for active carrier. 3) Carrier index to be used by a UE may be changed. 4) Specific carrier among UE-specific assignment carrier may be removed. 5) Which carrier among UE operation carrier set is anchor carrier is notified to a UE.

These carrier assignment methods need to be considered and carefully designed so that UE QoS is not degraded. In the following, corresponding procedure/methods will be disclosed.

Carrier management may be performed in various types. More specifically, carrier management may be performed in a manner of single carrier usage model or multiple-carrier usage model according to the management target.

First, single carrier management method will be described.

Single carrier management may be defined as assignment of single carrier to a UE, de-assignment of single carrier from the UE, carrier identity (e.g., carrier index) switching from one property to another property. In this case, the property may be carrier index, carrier usage model, power control model, etc.

For example, we may consider a case where a UE uses single carrier and another carrier instead of currently being-used carrier may be used for the UE. This situation occurs when the UE performs initial access to a cell or the UE performs handover. Since the UE does not know the system status or scheduler status during the initial access, it can result in an un-balanced carrier usage or it can cause an eNB to waste frequency resource due to unnecessary duplicated control information transmission. With this drawback or defect, the eNB would try to move the currently operating carrier of the UE to another carrier which would not cause such problems. Procedure for switching this operating carrier may be defined as following.

Figure 2:
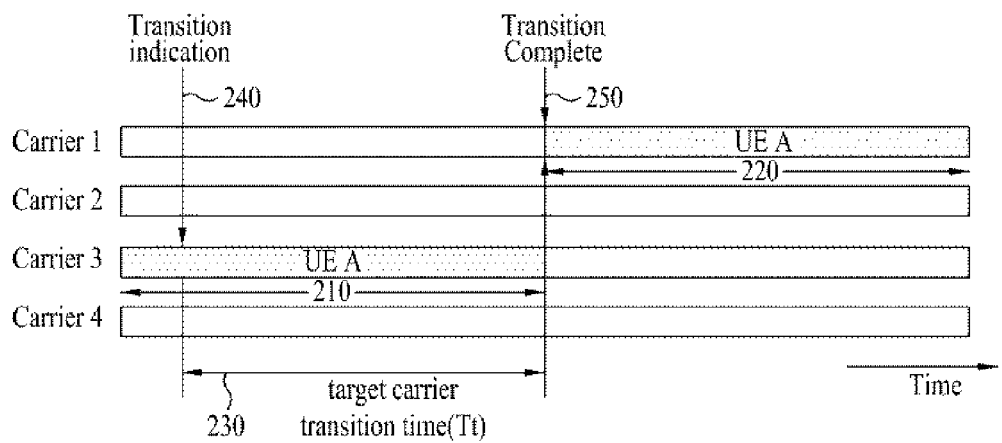
FIG. 2 illustrates disjoint carrier usage model according to embodiments of the present invention.

FIG. 2 illustrates disjoint carrier usage model according to embodiments of the present invention.

An eNB may determine if the carrier used by a UE does cause any drawback to system or UE operation S210. If it does, the eNB performs next step. Otherwise, the eNB may repeat the step of S210. The eNB may then indicate the target carrier to the UE S220. The UE may switch from the current operating carrier to the designated target carrier S230. After switching from one carrier to another one is finished, the eNB performs the step of S210. It is noted that the way to allocate the target carrier and the UE behavior may be differently defined depending on the target QoS management. For example following schemes can be envisioned.

As shown in FIG. 2, in disjoint carrier usage model, there is no overlapped region on each carrier usage interval 210 and 220. That is, the region of previously used carrier 210 is perfectly not overlapped with region of new carrier 220 in time domain. In this case, the target carrier movement indication of the eNB may include following features.

As shown in FIG. 2, target carrier transition time (Tt) 230 may mean a time difference between transition indication timing 240 and transition completion timing 250. Here, the target carrier transition time (Tt) 230 may be called as valid time, transition gap, etc. The target carrier transition time (Tt) 230 may be measured from receiving timing of transition indication 240 and transition completion timing 250 at the UE. If the UE receive target carrier information indicating target carrier and target carrier transition time information including time required for transiting to target carrier from the eNB, the UE may move from current carrier 210 to the indicated target carrier 220 based on received the target carrier transition time information and target carrier information.

The target carrier transition time (Tt) 230 is defined such as OFDM symbol positions/intervals/numbers, subframe positions/intervals/numbers, or radio frame positions/intervals/numbers. In case of single carrier transition, the position or interval information may be entity. If multiple carrier transitions are defined, the positions or interval information may be multiple entity which representing the target carrier transition time from one carrier to the other carrier.

After the UE complete to transit to the target carrier 220, the UE may explicitly or implicitly transmit ACK/NACK confirmation signaling indicating whether carrier switching of the UE is successful to the eNB. This ACK/NACK confirmation information may not be necessary if control message including the target carrier information and the target carrier transition time 230 is transmitted by high layer signaling, that is, not a L1/L2 signaling without ACK/NACK response.

However, if this ACK/NACK confirmation information is transmitted by L1/L2 control signaling, then the ACK/NACK indication is transmitted to the eNB. The ACK/NACK indication bit may play a role of protocol robustness. If there is no ACK/NACK confirmation on the transition to target carrier 220, then the eNB needs to fall back to old UE carrier configuration. In this case, error may be occurred.

Target carrier information indicating target carrier 220 may be represented as type of target carrier index. This target carrier index may be bitmap information having a predefined sizes, the predefined size may be represented as the total usable system carrier in the corresponding eNB. The target carrier index may be a simple index value counted according to frequency axis.

If the eNB wants to confirm the transition or measure the target carrier 220, the eNB may indicate information including behavior of the UE on the target carrier 220 to the UE.

In case of traffic transaction during the carrier transition of a UE, the ACK/NACK information on the UL PUSCH (Physical Uplink Shared CHannel)/(DL PDSCH) transmission need to be received from the target carrier 220. More specially, the UE may transmit the ACK/NACK confirm information to the eNB via the target carrier 220.

Figure 3:
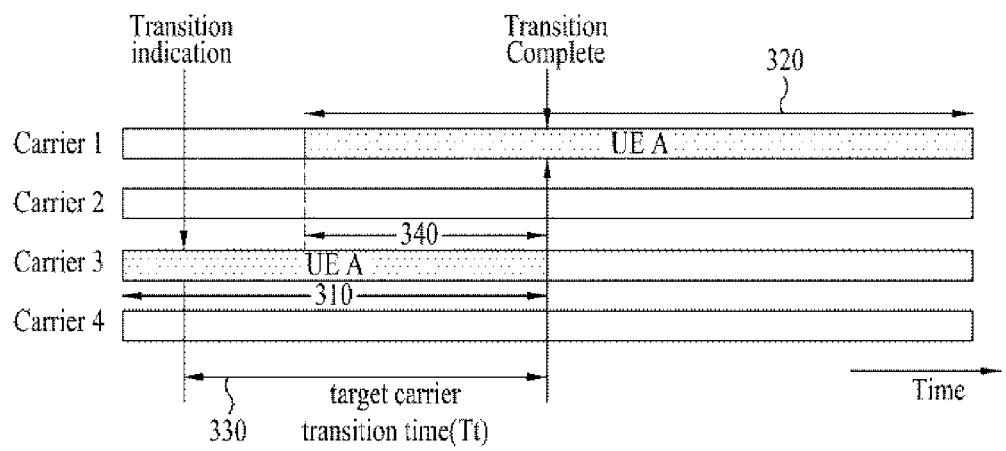
FIG. 3 illustrates overlapped carrier usage model according to embodiments of the present invention.

FIG. 3 illustrates overlapped carrier usage model according to embodiments of the present invention.

If capability of a UE is allowed, the UE may use the old carrier 310 and new carrier 320 simultaneously. In this case, the required information may be the same with disjoint carrier usage model in FIG. 2. However, since the ultimate used carrier is one, it is necessary to define what happens at during overlapped interval of carrier usage 340. Termination of old carrier 310 usage may be initiated by decision of an eNB or indication of the UE. Decision of the eNB or indication of the UE for usage termination of old carrier 310 will be further described below.

If a UE use temporally multiple carrier, then the transmission of data traffic or ACK/NACK confirm may be duplicated when there is ambiguity of which carrier is used by the UE. For example, the target carrier is downlink carrier, the old carrier (or previously used carrier) 310 and target carrier 320 may include same control information such as scheduling grant and the same data traffic. To determine whether the UE completed the transition to target carrier 320, the eNB need to discriminate which carrier is being used. To enable this functionality, the eNB may allocate slightly different grant information or ACK/NACK resource. For example, uplink ACK/NACK transmission may be controlled by CCE (Control Channel Element) index or DM RS (DeModulation Reference Signal) indication or different PUSCH allocation. On the other hand, this may be determined with carrier usage timer on the old carrier 310 in similar to disjoint carrier usage model.

In case that termination of old carrier 310 usage is determined by indication of the UE, the UE may transmit special information via the old carrier 310 or target carrier 320 or about the transition itself. For example, if UL carrier is changed from one carrier to another carrier, the UE may transmit special information (e.g., transmitting scheduling request or sounding transmission on the target carrier). If DL carrier is changed from one carrier to another carrier, the UE may trigger a scheduling request and transmit control information on the carrier transition completion.

It is noted that this single carrier may be an anchor carrier or normal carrier. The anchor carrier may be used for transmitting main control information such as system information, physical control channel, UE-specific or UE group-specific control information, etc. And the normal (active) carrier is for data transaction or measurement or limited control information.

The method of adding one carrier to a UE operating carrier set or removing one carrier from the UE operating carrier set may be also implemented by following procedure.

An eNB may indicate one carrier which to be added to the UE or removed from the UE. This control signal indicating carrier to be added to the UE or removed from the UE may be defined as RRC (Radio Resource Control) signal or L1/L2 control signaling. Preferably, the control signal includes the target carrier information, which may be represented by bitmap or logical index or physical carrier value. In addition, the control signal further includes the corresponding valid time or start time for the removed carrier or new carrier.

A UE needs to respond with ACK/NACK confirmation on the control signal. In this case, the carrier addition or removal is needed to check in both the UE and the eNB sides so that any protocol breach does not happen. This double check may be realized with simply high layer signaling or ACK/NACK response in both DL and UL directions.

For example, a UE may receive a control command from an eNB. However, the UE may not know whether the eNB received response of the UE. Therefore, additional ACK/NACK regarding the response of the UE is needed to transmit to the UE. This double check may be also applicable to previous carrier switching case as described in FIG. 2.

After predefined time duration, a removed carrier is invalidated and not be used as normal carrier or anchor carrier. In case of carrier removal, the time duration may be presumed to be zero. In contrary, if a carrier is to be added to a UE operating carrier set, it is validated at the indicated start time or after indicated time duration.

As described above, single carrier management method is described. Hereinafter, multiple carrier management methods will be described.

Even though multiple carriers are allocated or switched or removed, the basic principle does not change significantly compared to the single carrier management case. Since multiple carriers are involved in the carrier allocation procedure, it is needed to consider the case that all the carriers should be simultaneously changed or not. If all the involved carriers are changed simultaneously, then every procedure defined in single carrier management method may be reused except for multiple carrier lists. Here, the multiple carrier lists may be also represented as bitmap or carrier indices.

However, if anchor carrier(s) among the multiple carriers exists, overall operation may be defined via the anchor carrier. That is, carrier management request may be delivered through an anchor carrier and corresponding change result or request processing result may be also delivered via designated anchor carrier if uplink anchor carrier exists.

Hereinafter, the method of indicating which carrier is an anchor carrier indication will be described.

If a UE is utilizing multiple carriers, overhead due to using the multiple carriers may be occurred, and redundant information may be transmitted. For example, if the UE receives system information, then the corresponding system information is needed to transmit on every downlink carrier. Transmission of the corresponding system information will waste frequency resource without any help to the UE operation. However, since the UE does not know which carrier will transmit the expecting control information, the UE may need to decode blindly every downlink carrier in order to detect a specific control channel. Therefore, to reduce the decoding complexity and frequency resource waste, to enhance performance of the multi-carrier operation as much as possible, one or more special carriers are preferably included in multiple carriers so that those carriers are responsible for the common system information or UE-group or UE-specific control information. This carrier may be called as anchor carrier, primary carrier, or reference carrier, etc. One or more specific carriers among the multiple carrier used by a UE is defined as cell-specific anchor carriers or UE-specific anchor carriers.

Figure 4:
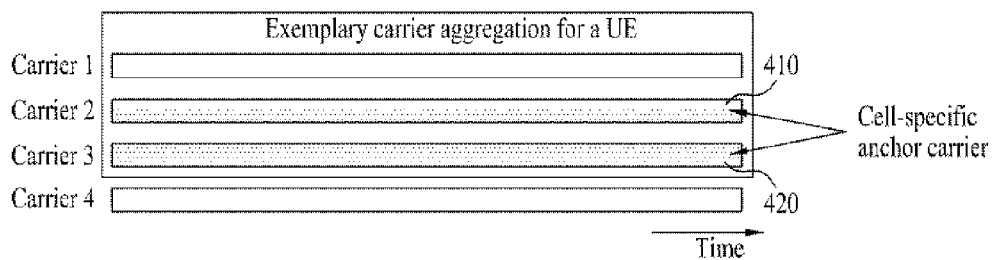
FIG. 4 illustrates a case that multiple cell-specific anchor carriers is allocated for a UE according to embodiments of the present invention.

FIG. 4 illustrates a case that multiple cell-specific anchor carriers are allocated for a UE according to embodiments of the present invention.

One or more specific carriers may be defined as cell-specific anchor carriers or UE-specific anchor carriers depending on the system configuration. If cell-specific anchor carriers are defined, then it is obvious that the UE can receive the required control information only when decoding those cell-specific anchor carriers. However, even though cell-specific carrier may be defined, if a UE utilizes multiple cell-specific anchor carriers 410 and 420 as its own component carriers, then UE is still necessary to decode multiple downlink carriers to receive system information. Therefore, it is more efficient to select minimum number of anchor carriers which are the target carrier(s) to be monitored by the UE.

The method of indicating which carrier is anchor carrier among multiple UE carrier set may be one or combination of following methods.

For instance, cell-specific anchor carrier becomes UE-specific anchor carrier when it has the lowest/highest carrier index/value and belongs to UE carrier set. In this case, an eNB may directly notify UE-specific anchor carrier to the UE.

An eNB may directly indicate anchor carrier to a UE using bitmap or carrier index when single or multiple carriers are assigned to the UE. It is noted that if whole carriers used by a UE are not defined in a specific time, then the anchor carrier definition may be duplicated. In that case, the latest anchor carrier indication can override the previous setting or multiple anchor carriers may be allowed.

Anchor carrier may be changed from one carrier to the other carrier depending on system load/operating environment. In this case, new anchor carrier index may be explicitly informed to the UE or may be next lowest/highest carrier index/value.

It is noted that anchor carrier may be set at the end of random access procedure through high layer signaling or L1/L2 control signaling. If a UE wants to change anchor carrier, then random access procedure may be initiated.

Periodic high layer signaling indicating which anchor carrier is the UE's anchor carrier may be transmitted to the UE. In this case, the periodic high layer signaling may include all the anchor information of multiple UEs, the signaling is broadcasted to UEs.

Multiple anchor carriers may be defined and modified depending on the UE operation mode such as MIMO, Coordinated Multi-Point (CoMP), or LTE-A features. Anchor carrier may behave differently depending on the UE transmission mode or operation mode on that carrier or anchor-specific supplementary carriers.

Anchor carrier control message may be defined with high layer signaling (e.g., RRC) or L1/L2 control signaling, where anchor carrier specific message may be defined separately from carrier allocation message, or jointly defined so that carrier set indication and anchor carrier indication may always be informed simultaneously.

Figure 5:
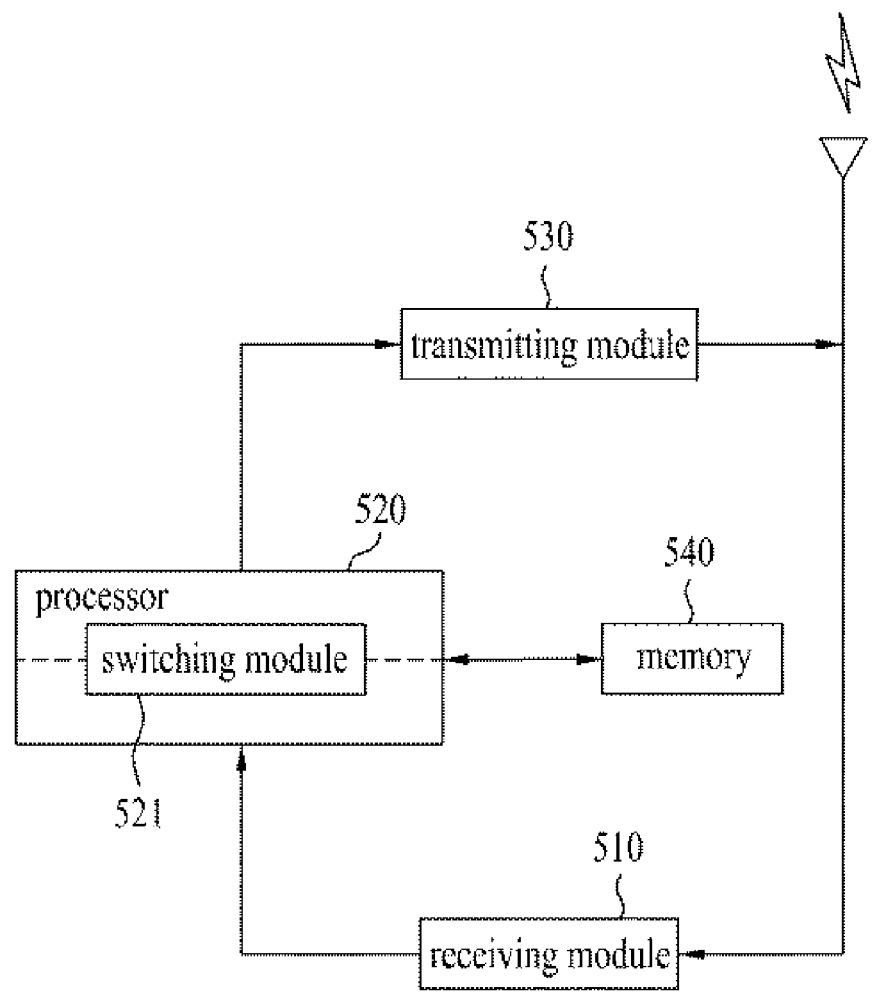
FIG. 5 is a diagram for configuration of a user equipment apparatus according to one preferred embodiment of the present invention.

FIG. 5 is a diagram for configuration of a user equipment apparatus according to one preferred embodiment of the present invention Referring to FIG. 5, the UE may include a receiving module 510, processor 520, a transmitting module 530, and memory 540.

The receiving module 510 may receive target carrier information indicating a target carrier of the UE and target carrier transition time information indicating a time difference between receiving timing of transition indication and transition completion timing from an base station.

Processor 520 may include a switching module 521. The switching module 521 may switch a current operating carrier to the indicated target carrier based on the received the target carrier transition time information and the target carrier information.

The transmitting module 530 may transmit a ACK/NACK confirm signal indicating whether the target carrier transition time information and the target carrier information is received without error via on the target carrier to the base station. Alternatively, the transmitting module 530 may transmit a ACK/NACK confirm signal indicating whether the target carrier transition time information and the target carrier information is received without error via on the target carrier and current operating carrier to the base station.

Memory 540 may information calculated in the processor 520 for a predetermined period of time, and may be replaced with a buffer (not shown) or the like.

The embodiments described below are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of operations in the embodiments of the present invention may be changed. Some components or features of one embodiment may be included in another embodiment or may be replaced with corresponding components or features of another embodiment.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

INDUSTRIAL APPLICABILITY

The method for switching operating carrier at a user equipment (UE) in a wireless communication system is applicable to IEEE 802.16m system, 3GPP LTE system, and like that.

The invention claimed is:

1. A method for receiving carrier information at a mobile station (MS) in a wireless communication system, the method comprising:
   receiving a message comprising a carrier index of a target carrier for a current primary carrier change from a base station (BS),
   wherein the message further comprises action time information indicating a start time in which the mobile station switches from a current primary carrier to the target carrier, and
   wherein the start time is defined by a frame number.

2. The method according to claim 1, further comprising: switching from the current primary carrier to the target carrier based on the message.

3. The method according to claim 2, wherein the message is received on the current primary carrier.

4. The method according to claim 1, wherein the message further comprises information on whether r the current primary carrier is deactivated or activated after the current primary carrier change.

5. The method according to claim 2, further comprising:
   receiving data on the current primary carrier before switching from the current primary carrier to the target carrier; and
   receiving data on the target carrier after switching from the current primary carrier to the target carrier.

6. The method according to claim 2, further comprising:
   receiving data on the current primary carrier before switching from the current primary carrier to the target carrier; and
   receiving data on the current primary carrier and the target carrier after switching from the current primary carrier to the target carrier.

7. A method for transmitting carrier information at a base station (BS) in a wireless communication system, the method comprising:
   transmitting a message comprising a carrier index of a target carrier for a current primary carrier change to a mobile station (MS),
   wherein the message further comprises action time information indicating a start time in which the mobile station switches from a current primary carrier to the target carrier, and
   wherein the start time is defined by a frame number.

8. The method according to claim 7, wherein the message is transmitted on the current primary carrier.

9. The method according to claim 7, wherein the message further comprises information on whether the current primary carrier is deactivated or activated after the current primary carrier change.

10. The method according to claim 7, further comprising:
    transmitting data on the current primary carrier before the mobile station switches from the current primary carrier to the target carrier; and
    transmitting data on the target carrier after the mobile station switches from the current primary carrier to the target carrier.

11. The method according to claim 7, further comprising:
    transmitting data on the current primary carrier before the mobile station switches from the current primary carrier to the target carrier; and
    transmitting data on the current primary carrier and the target carrier after the mobile station switches from the current primary carrier to the target carrier.

* * * * *